United States Patent Office

3,398,868
Patented Aug. 27, 1968

3,398,868
APPARATUS FOR SEVERING GLASS SHEETS
Edward W. Curtze, Pittsburgh, George O. Wehner, Bethel Park, and John M. Barsom, Pittsburgh, Pa., assignors to PPG Industries, Inc., a corporation of Pennsylvania
Filed Oct. 4, 1966, Ser. No. 584,145
2 Claims. (Cl. 225—103)

This application relates to an improved apparatus of severing glass.

In the prior art, one apparatus of severing glass was to use what is known as a "snap roll." A scored sheet of glass is run down a suitable conveyor, and when the center line of the upwardly rising snap roll is in alignment with the score line, the glass is struck a quick blow and severed.

The prior art practice required that the center line of the snap roll and the score line of the glass be syncronized in their positions, so that they are coincident at the time of the contact.

The distribution of moments about a score line in an annealed glass plate has a great influence on the quality of the cut edge. It has been demonstrated that one of the conditions for ideal cutting is a symmetric moment distribution about the score line. The prior art mechanical cutting methods and apparatus provide only a single line as a fulcrum, and that line or point must coincide with the roll on which the glass was severed. Due to a variation of up to 30 percent in the forces required to open similar score lines, and due to the difficulties of timing the activated roll so that the instant of impact corresponds exactly when the score line is located at the center of the activated roll, it is extremely difficult, and sometimes impossible, to produce symmetric moments at the instant of severing.

Applicants' invention is an improved snapping apparatus which eliminates the necessity of having to simultaneously line up the score line and the center line of the snap roll. Applicants' apparatus applies a constant bending moment about a score line while the score is positioned over a wide range relative to the snapping rolls. Hence, this apparatus is termed a "constant moment snapper."

Referring to the drawing.

A top roll assembly may be made of component parts, as follows. Each side of a top assembly is a duplicate of the other. Therefore, a detailed description of one typical construction will be given.

A side frame 15 is fastened to a cross piece 14. A rocker arm 19 is attached to side frame. A pivot joint, or pin, 17 provides a pivotal connection between the side frame and each rocker arm.

Figure 1:
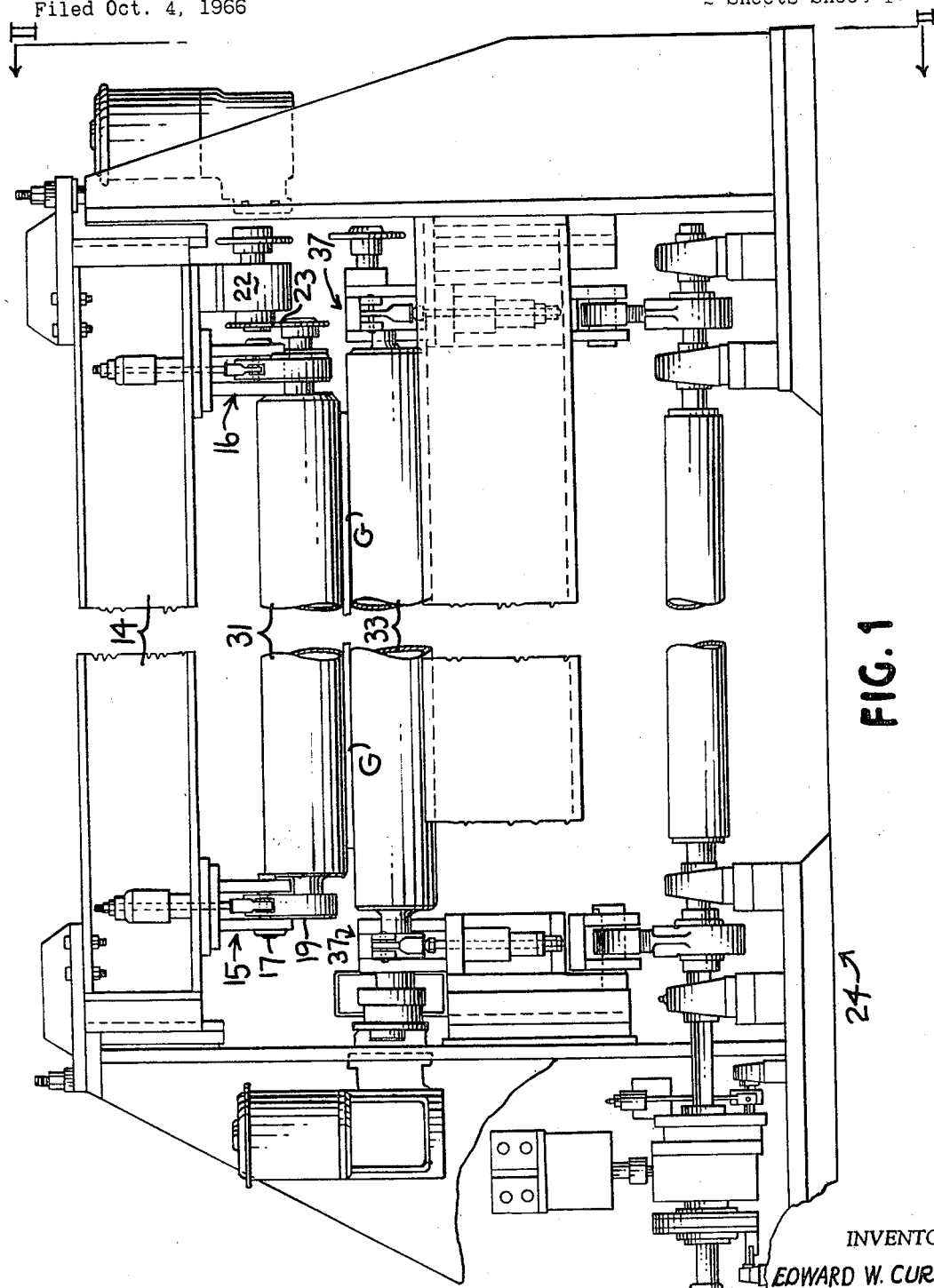
FIG. 1 is a semi-schematic end view of both the upper and lower snap rolls, showing the relation of the roll assembly, the activating mechanism and support assembly.

A pair of glass contacting rolls 30 and 31 are positioned between two side frames 15 and 16, and span a suitable glass conveying table (not shown) and, of course, spanning a piece of glass as shown in FIG. 1. The rolls 30 and 31 are driven by any suitable means, such as a motor 22 and a sprocket chain 23. The rolls rotate at about the speed of glass travel to insure that no marring or scratching occurs during contact with the glass. A pair of springs 25 and 26 provide a dampening effect on the rocker arm.

Figure 2:
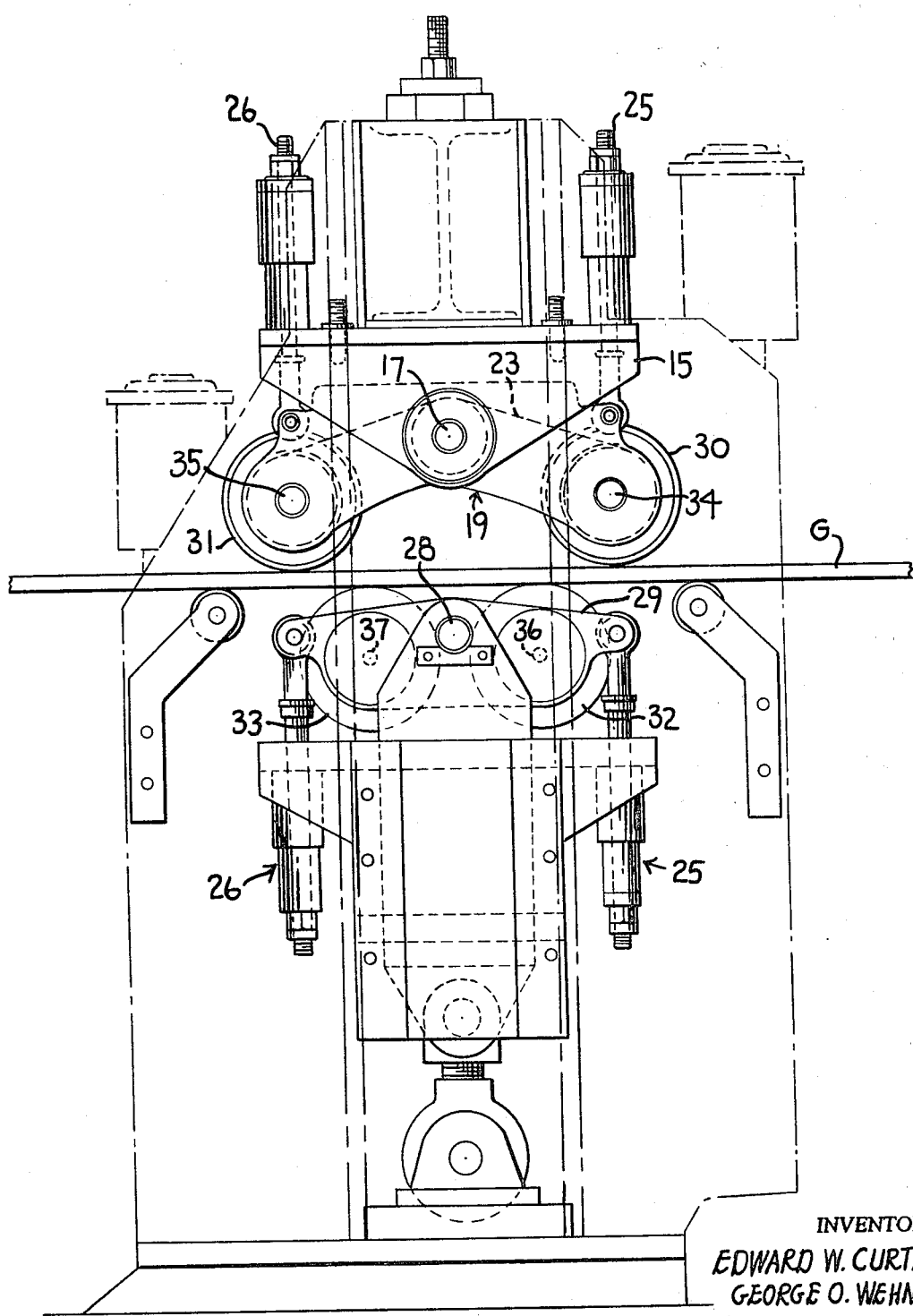
FIG. 2 is a side view of the snap roll section, with the glass travelling into and through the roll.

FIG. 2 is an illustration from a side view showing the position of the top and bottom support assembly in relationship to one another.

A bottom supporting assembly has a pair of side plates 37 in spaced relationship across a conveyor. A rocker arm 29 is pivotally attached to a side plate by a pivot pin 28. A pair of glass contacting rolls 30 and 31 are rotatably mounted to the rocker arm, and span a glass sheet to be severed.

It is obvious that the distance between pivot points 34 and 35 may be increased to quite a distance and the corresponding distance between pivot points 36 and 37 may also be increased. It is necessary, however, that the distance between points 36 and 37 be less than the distance between points 34 and 35. The distance between the rotatable mounting of the snap rolls 34 and 35 and their corresponding pivot points, i.e., 17, must be equal as the distance between points 36, 37 and 28 must be equal. With this arrangement of pivots and rolls, it is possible to apply a uniform bending moment over a relatively long distance between points 36 and 37 as the glass travels between pivot points 37 and 36.

In operation, a sheet of glass is brought down any suitable conveyor line, and a score is imposed on a surface of the glass by any known scoring means. The glass to be severed proceeds into the severing apparatus until the score line is positioned between the two opposing pairs of snap rolls. In response to a signal or command, one pair of rolls is moved inwardly, applying pressure to the surface of the glass, and resulting in a uniform bending moment about the score line regardless of the position of the score line relative to the snap rolls.

It is obvious that other embodiments of this invention are contemplated, i.e., that the top and bottom snap rolls may be mounted in a position for snapping glass as it travels perpendicular to the horizontal, such as utilized in a window glass drawing machine with the corresponding scorer and laydown apparatus.

It is particularly adapted to cutting large continuous sheets where the bending moment about the score line is quite large due to the long distances involved between the ribbon of glass as it leaves the drawing machine and goes up through the lehr to the cutting apparatus.

One device for sensing a score, such as a light detector, etc., may be used to detect the oncoming score in the glass. Any suitable actuating means may be used to trigger a power means to move the appropriate roll assembly against the glass.

Any time after the score line is between rolls 30 and 31, for example, the rolls are contacted to the glass and the pressure rolls 30 and 31 against 34 and 35 produce a constant moment bending insuring a uniform separation of the glass along the score.

What we claim is:
1. Apparatus for severing glass sheets, comprising:
 (I) First supporting means, comprising—
  (a) a rocker arm means pivotally mounted to each side of said support;
  (b) a pair of glass contacting means rotatably mounted to said rocker means, each of said glass contacting means being mounted equidistant on said rocker from said pivotally mounted connection with said support means;
  (c) said pivot mounting being in a plane different from that of said rotatable mounting between said glass contacting means, and said rocker arm means.
 (II) Second supporting means, comprising—
  (a) rocker arm pivotally mounted to each side of said support means;
  (b) a second pair of glass contacting means rotatably mounted to said rocker arms, said rotatable mountings being equidistant from said pivot means;
 (III) The rotation points of one pair of glass contacting means being spaced at a greater distance from the pivot point than the rotation points of another of said pair of glass contacting means;

(IV) Said first supporting means being placed in apposition with said second support means, and having said first and said second pivot points of said rocker arms positioned in a line relative to each other, so that each rocker arm articulates about a pivot point, the pivot points being in a line.

2. Apparatus for severing a sheet along a pre-induced score line, comprising:

(I) A bottom support assembly means, said means comprising—
  (a) a pair of supporting frames mounted in spaced relationship;
  (b) a rocker arm;
  (c) means for pivotally mounting said rocker arm to said support assembly;
  (d) a pair of snap rolls rotatably mounted at either end to a rocker arm, each of said rolls being positioned equidistant from said pivot means.

(II) A top supporting roll assembly, comprising—
  (a) a pair of supporting frame mounted in spaced relationship;
  (b) a rocker arm pivotally mounted to said support means;
  (c) a pair of snap rolls each of said rolls rotatably mounted at either end to a rocker arm, each of said rolls being pivotally mounted equidistant from said pivot means.

(III) Means for moving one of said support assembly means relative to the other support assembly means;

(IV) Said first pivotal mounting means being aligned with and positioned in a line with said second pivotal mounting means;

(V) A distance between rotatable mounting points of one set of rolls on one snap roll assembly being greater than the distance between rotatable mounting points of the other of said snap roll assemblies, so that the first and second snap roll supporting assemblies are articulated about a pair of pivot points lying in the same line.

References Cited
UNITED STATES PATENTS 3,300,112   1/1967   Tailleur et al. ____ 225—96.5 X JAMES M. MEISTER, *Primary Examiner.*